May 10, 1938.　　　S. E. BOUCHARD　　　2,117,139
OPHTHALMIC MOUNTING
Filed March 27, 1935
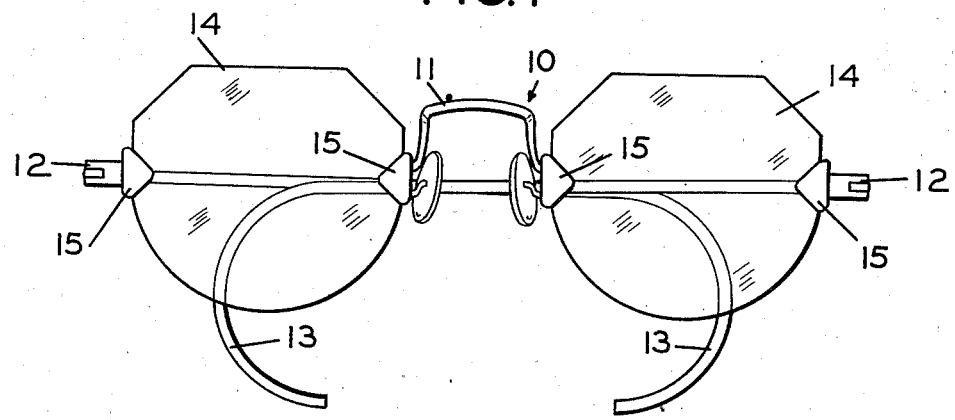
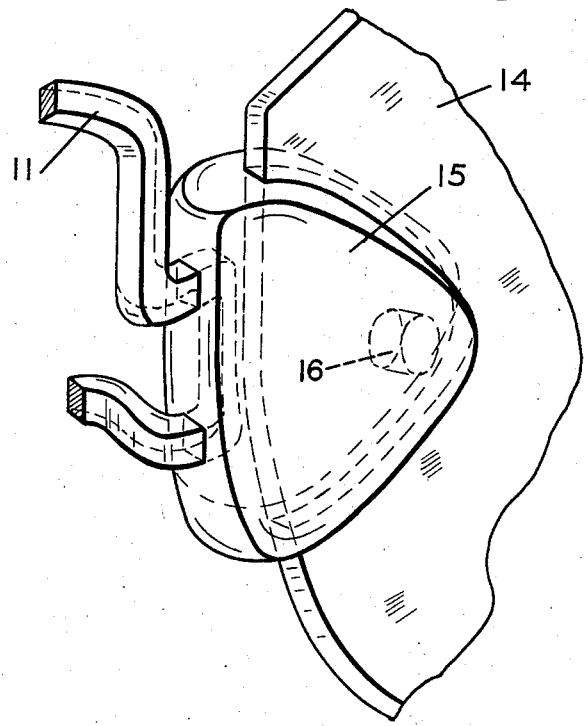
SAMUEL E. BOUCHARD
INVENTOR
BY
ATTORNEY Patented May 10, 1938

2,117,139

UNITED STATES PATENT OFFICE 2,117,139

OPHTHALMIC MOUNTING

Samuel E. Bouchard, Rochester, N. Y., assignor to Bausch & Lomb Optical Company, Rochester, N. Y., a corporation of New York Application March 27, 1935, Serial No. 13,316

5 Claims. (Cl. 88—47)

The present invention relates to ophthalmic mountings and more particularly it has reference to methods and means for attaching mountings to lenses to provide rimless spectacles.

One of the objects of the present invention is to provide a new method and means for attaching rimless mountings to lenses. Another object is to provide a molded connecting strap for attaching rimless mountings to lenses. A further object is to provide a method for attaching rimless mountings to lenses in which the connecting means is molded in place. These and other objects and advantages reside in certain novel features of arrangement and combination of parts and processes as will hereinafter be more fully set forth and pointed out in the appended claims.

Referring to the drawing:

Fig. 1 is a front elevation of a pair of spectacles embodying my invention.

Fig. 2 is an enlarged fragmentary view showing the bridge connection.

One embodiment of my invention is illustrated in the drawing wherein 10 indicates generally a pair of spectacles having a bridge 11 and endpieces 12 carrying temples 13, secured to lenses 14 by means of molded straps 15. As shown in Fig. 2 the lens 14 is formed with an aperture 16, and, when the strap 15 is being molded it is pressed into this aperture.

The straps 15 are composed of moldable material and can be supplied preformed to the proper shape by the manufacturer or the strap can be formed and shaped from bulk material when the spectacles are assembled. If desired, the bridges 11 and endpieces 12 can be furnished with preformed moldable straps 15 attached. The straps 15 must be formed of a material which softens at a temperature insufficient to injure the mounting or the polished surface of the lens and which solidifies or hardens into a rigid form at ordinary temperatures.

A large variety of both metallic and non-metallic substances fulfill these requirements. Non-metallic plastics such as the cellulose compounds sold under the trade names of "Lumarith", "Plastine", "Celastine" and "Sicoid" are satisfactory as are metallic alloys of relatively low melting point. Various substances dissolved in solvents or various amalgams can likewise be used.

The manner of molding the strap 15 depends largely upon the material used. Substances which become merely plastic upon heating are softened and pressed into the desired shape, while in the case of substances which become fluid or semi-fluid, the lens and mounting are held in a suitable mold and the substance is introduced into the mold and allowed to harden. It is desirable but not necessary, except in the case of preformed straps, that the material of the strap 15 be such that it can be re-softened at will in the event that it becomes desirable to remove the lens from the mounting.

In the assembling of spectacles according to this invention the bridge 11 and each endpiece 12 is securely embedded in its moldable strap 15. It is desirable that each part of the mounting to be secured in its strap 15 be provided with some anchoring means such as the U-shaped portion of the bridge as shown in Fig. 2, or an enlarged head or the like. The aperture 16 in the lens 14 serves merely as an anchoring means and can be replaced by other anchoring means such as a depression, for example.

From the foregoing, it will be apparent that I am able to attain the objects of my invention and provide a method and means for attaching rimless mountings to lenses in which the connecting means is molded into place. Various modifications can, of course, be made without departing from the spirit of my invention or the scope of the appended claims.

I claim:

1. In combination a lens having a depression adjacent one edge, a lens strap formed of moldable material extending into said depression and around said edge of said lens, and an ophthalmic mounting having a portion completely embedded in said material.

2. In combination, a lens having anchoring means adjacent one edge, a lens strap formed of moldable material extending around the edge of said lens and enveloping said anchoring means, a spectacle bridge, and anchoring means on said bridge embedded in said material.

3. A pair of spectacles comprising a pair of lenses, anchoring means on the nasal edge of each lens, a bridge, anchoring means on each side of said bridge, two masses of moldable material, one enveloping each of the anchoring means on said bridge, each of said masses being molded to form a lens strap enveloping the anchoring means on one of said lenses.

4. In combination an ophthalmic lens having an aperture therein adjacent one edge, a lens strap of thermoplastic material extending over said edge of said lens and into said aperture, and an ophthalmic mounting having a part embedded in said strap.

5. In combination, a lens having an aperture adjacent one edge, a bridge, a nose pad, a U-shaped member connecting said bridge and said nose pad, and a non-metallic, thermoplastic strap extending over said edge of said lens into said aperture, said member being embedded in said strap.

SAMUEL E. BOUCHARD.